UNITED STATES PATENT OFFICE.

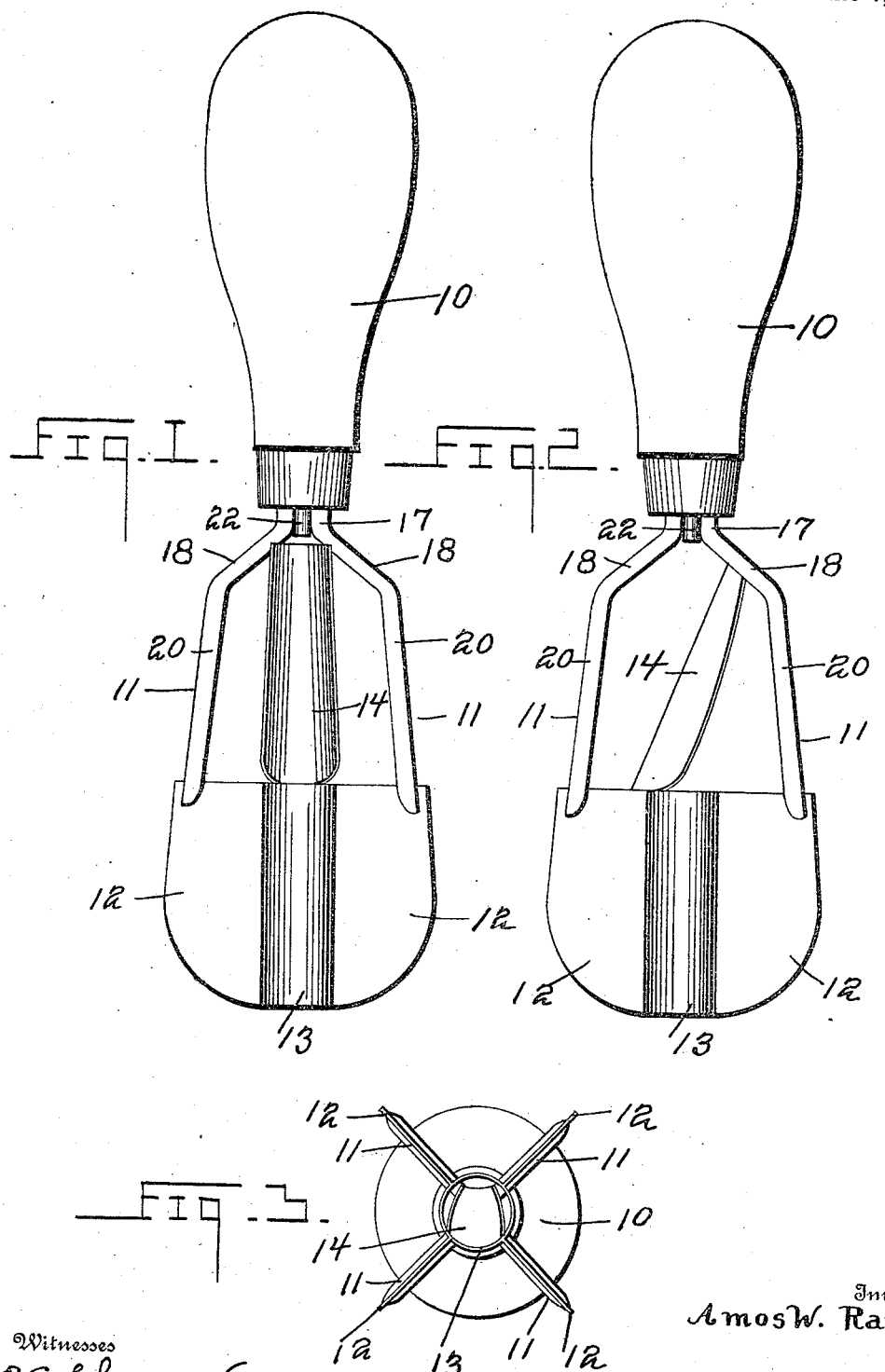

AMOS W. RAND, OF MONDOVI, WISCONSIN.

APPLE CORER AND SLICER.

961,015.	Specification of Letters Patent.	Patented June 7, 1910.

Application filed October 16, 1908, Serial No. 458,052. Renewed November 5, 1909. Serial No. 526,472.

*To all whom it may concern:*

Be it known that I, AMOS W. RAND, a citizen of the United States, residing at Mondovi, in the county of Buffalo and State of Wisconsin, have invented certain new and useful Improvements in Apple Corers and Slicers, of which the following is a specification.

This invention relates to vegetable and fruit choppers, and more particularly to such an instrument adapted especially for removing the core of an apple and slicing the apple into a plurality of sections simultaneously.

Another object is to provide such a device having a handle disposed centrally thereover, as is most convenient for the manipulation of the device, and provided with a means for ejecting cores after being removed from fruit, so that the cores will not engage against the handle and thus clog the device.

A most important object of the invention is to provide such a device which may be also used as an ordinary vegetable chopper, or meat chopper, without becoming cloyed. A similar function has been performed by certain apple peelers, and corers, but it is frequently found in these machines that the slicing and coring operations are not performed satisfactorily. Also, the pressure required to force the fruit into engagement with the coring and slicing knives is frequently so great as to result in the incomplete performance of the operation by reason of the frailty of the fruit.

Other objects and advantages will be apparent from the following description and it will be understood that changes in the specific structure shown and described may be made within the scope of the claim without departing from the spirit of the invention.

In the drawings forming a portion of this specification, and in which like numerals of reference indicate similar parts in the several views, Figure 1 is a side view of the device, Fig. 2 is a view at right angles to Fig. 1, Fig. 3 is a bottom view of the device.

Referring to the drawings, there is shown a corer and slicer comprising a handle 10 carrying a plurality of divergent wire arms 11 bifurcated at their lower ends and having secured therein the upper edges of a plurality of blades 12. A tubular knife 13 is engaged centrally of the blades 12 and is provided with an integral upwardly extending core guide 14 adapted to force cores laterally as they pass outwardly through the knife 13, as will be apparent. The blades 12 and the knife 13 are all adapted to be stamped from sheet material, the blades 12 being secured to the knife 13 and arms 11 by means of solder, though it will be understood that any suitable method may be utilized for forming the knife and blades and disposing them upon the handle. The blades 12 are rounded at their lower outer corners as shown.

It will be seen that the device is readily adapted to use as a vegetable chopper in the manner usual with potato choppers and like implements.

The arms 11 comprise a main shank portion 17 from which there extends a diagonal portion 18 carrying a blade-engaging portion 20 these latter portions on all the arms lying approximately in parallel spaced relation. The handle is provided with the usual recess in such devices, and the shank portions are disposed concentrically therein, a wedge member 22 being forced centrally therebetween to hold them against disengagement. It will be seen that by the manner of securing the blades to the arms 11 liability of loosening of the blades therefrom is largely obviated.

What is claimed is:—

A combined vegetable chopper and apple corer combining a handle portion a plurality of wire arms engaged therein, a circular wedge member concentrically engaged between the arms, said arms being divergent and having their lower end portions disposed in approximately parallel spaced relation, said arms having their lower ends bifurcated, radial blades engaged closely in the bifurcated portions, said blades having their lower side edges curved inwardly to form continuations of their base edges, a tubular blade secured to the inner edges of the radial blades, said tubular blade having an integral upwardly extending guide portion inclined thereover, to deflect a core laterally of the handle.

In testimony whereof I affix my signature, in presence of two witnesses.

AMOS W. RAND.

Witnesses:
P. H. URNESS,
L. H. HOWARD.